United States Patent [19]
George

[11] 4,445,678
[45] May 1, 1984

[54] PRECISION ALIGNED SPLIT V-BLOCK

[76] Inventor: Irwin S. George, 3240 Siringo Rd., Santa Fe, N. Mex. 87501

[21] Appl. No.: 381,453

[22] Filed: May 24, 1982

[51] Int. Cl.³ .............................................. B25B 1/00
[52] U.S. Cl. ...................................... 269/88; 269/99; 269/282; 269/900; 269/902
[58] Field of Search ................. 51/216 R, 216 H, 219; 90/DIG. 17; 269/99–100, 900, 902, 101, 262, 282, 88

[56] References Cited

U.S. PATENT DOCUMENTS

| | | |
|---|---|---|
| 893,875 | 7/1908 | Schneider . |
| 1,093,029 | 4/1914 | Bowen . |
| 1,329,728 | 2/1920 | Sovereign ........................ 269/100 |
| 1,471,118 | 10/1923 | Gething ........................... 269/101 |
| 1,923,967 | 8/1933 | Brown . |
| 2,371,831 | 3/1945 | Leming . |
| 2,932,995 | 4/1960 | Durfee . |
| 4,151,984 | 5/1979 | Zapart . |
| 4,340,211 | 7/1982 | Chiappetti ........................ 269/902 |

Primary Examiner—Robert C. Watson
Attorney, Agent, or Firm—Paul D. Gaetjens

[57] ABSTRACT

A precision aligned split V-block for holding a workpiece during a milling operation having an expandable frame for allowing various sized workpieces to be accommodated, is easily secured directly to the mill table and having key lugs in one base of the split V-block that assures constant alignment.

7 Claims, 8 Drawing Figures

PRECISION ALIGNED SPLIT V-BLOCK

BACKGROUND OF THE INVENTION

1. Field of The Invention

This invention relates to a split clamping device that is expandable to hold different sized and shaped workpieces. A second important feature is positive aligning using key lugs contained in the base which allows repeated and accurate realignment of the V-block. Used in pairs, the V-blocks can clamp long workpieces for cutting, boring, notching, and making various angle joints for pipes. By use of spacers inserted between the split V-blocks, an adjustable workpiece clamp bar, and appropriate length tie rods, a wide variety of milling tasks on different sized workpieces can be accomplished using the clamping device of this invention.

2. Prior Art

1. U.S. Pat. No. 2,389,243 discloses a jig for use in drilling operations in round stock, said jig having a V-shaped upper and lower section. The jig is suitable for production operations and is not easily adjustable for general machining operations. The split V-block of this invention has a wide range of clamping capabilities and can be easily and quickly set up for various milling operations.

2. U.S. Pat. No. 3,423,885 discloses a sine V-block having a top surface in the block for tapped holes to secure a hold down clamp that holds the workpiece in place. This V-block is used primarily on a magnetic chuck for grinding operations using a surface grinder. The precision aligned split V-block of this invention has removable keyed lugs mounted in the base of one block that assures alignment, and has greater utility in various other milling operations.

3. U.S. Pat. No. 2,364,150 is a conventional V-block with a special clamping device consisting of adjustable work-holding screws that allow milling of the top portion of the workpiece. In addition, a removable steel insert lines the V-notch of the block which is similar to this invention, but this V-block is not split so as to accommodate different sized workpieces.

None of the enclosed patents have features such as size adjustment, positive locating lugs, and adaptability to several machining operations. The split V-block gives three different sized clamping devices in one complete unit. Lack of capability for quick setup, difficulties in alignment, and application to only one special machining operation are all limitations found in the prior art. Used in pairs, the split V-blocks can hold long material in perfect alignment on the Bridgeport Mill for cutting keyways in shafts, drilling, boring, facing to length, notching, making cut-outs for joining two pipes at right angles or any other angle.

OBJECTS OF THE INVENTION

It is an object of this invention to provide a split clamping device that can accommodate a wide variety of different sized workpieces.

It is a further object of this invention to provide a split clamping device that can be secured or bolted directly to the mill table.

It is another object of this invention to provide a split clamping device that can be accurately realigned from one setup to the next and at a variety of angles.

It is a still further object of this invention to provide a lightweight, speedy setup and versatile clamping device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The precision aligned split V-block described herein includes the capacity to adjust to a large variety of different workpiece sizes by means of an adjustable clamp position and insertion of a spacer between each half of the V-block. Key lugs mounted in the base of one-half of the V-block engage one T-slot of the mill table and thus provide repeated and easy alignment of the V-block. Another critical feature of this split V-block is the use of T-slot in the mill table to provide a means to easily and quickly anchor the V-block to the mill table. The T-slot holds the T-nut into which a clamp bolt is threaded that engages the hold down slot of the V-block. Four clamp bolts are used, two of which are aligned with the key lugs and all bolts are attached to the table by means of hold down slots, T-slots and T-nuts. Location of the key lugs depend on the size of the workpiece clamped in the V-block.

DETAILED DESCRIPTION OF THE PREFERRED EMBODIMENT(S) IN THE PRESENT INVENTION

Figure 1:
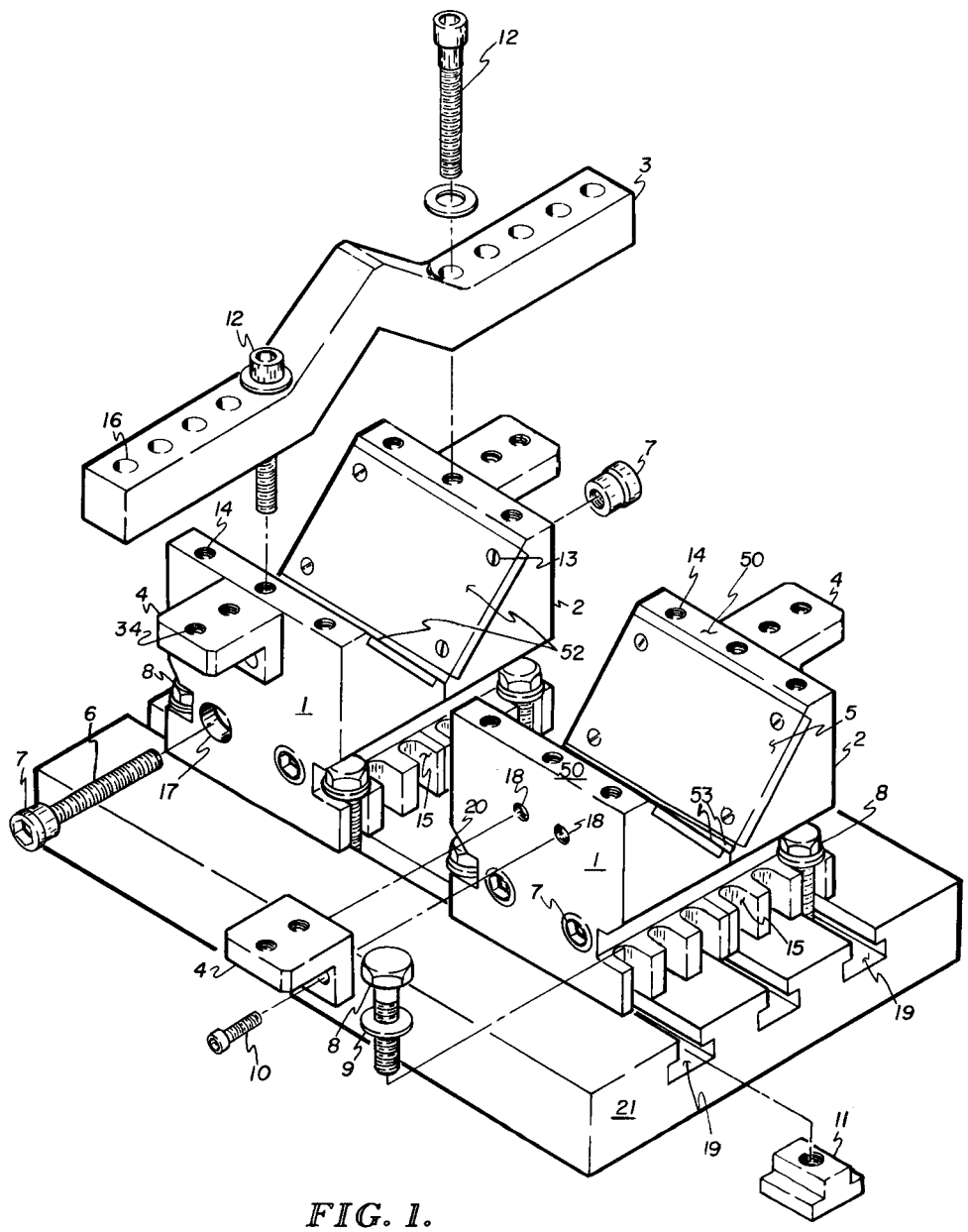
FIG. 1 is a perspective view of two split V-blocks of this invention with several exploded cooperating components.

As shown in FIG. 1, the split V-block 52 of this invention comprises two halves 1 and 2 forming a longitudinally extending V-shaped notch 53, each of the halves being held together by two threaded tie rods 6 transversely extending through the halves 1, 2 by means of tie rod ports 17 and secured by allen nuts 7 at each end. Extending outwardly from the top edges of the V-shaped notch 53 are top surfaces 50 having tapped holes 14 formed therein for receiving clamp bar 3 retained in place by allen bolts 12 and washer. The V-shaped notch 53 has a recessed slot that contains a hardened steel insert 5 to resist wear and maintain accuracy during the milling operation. The insert 5 is secured in place by four flat head screws 13 which are flush with the top face of insert 5. Adjacent to and flush with the top surfaces 50 of each half 1, 2 are angle brackets 4 secured by threaded bolts 10 through threaded ports 18. The angle brackets 4 permit larger diameter working material 35 to be clamped (see FIG. 5). The clamp bar 3 on each side of center "V" has, equally spaced holes 16 and along with multiple tapped holes 14 allow for several positions of clamping. The V-block 52 is clamped to a mill table 21 having three T-slots 19 running longitudinally the length of the mill table with each slot containing at least two tapped T-nuts 11. Threaded clamp bolts 8 with washers engage hold down slots 15 and anchored in T-nuts 11. Four bolts 8 secure each V-block 52. Two V-blocks are shown in FIG. 1 where long tubing, bar, or other working material could be held.

Figure 2:
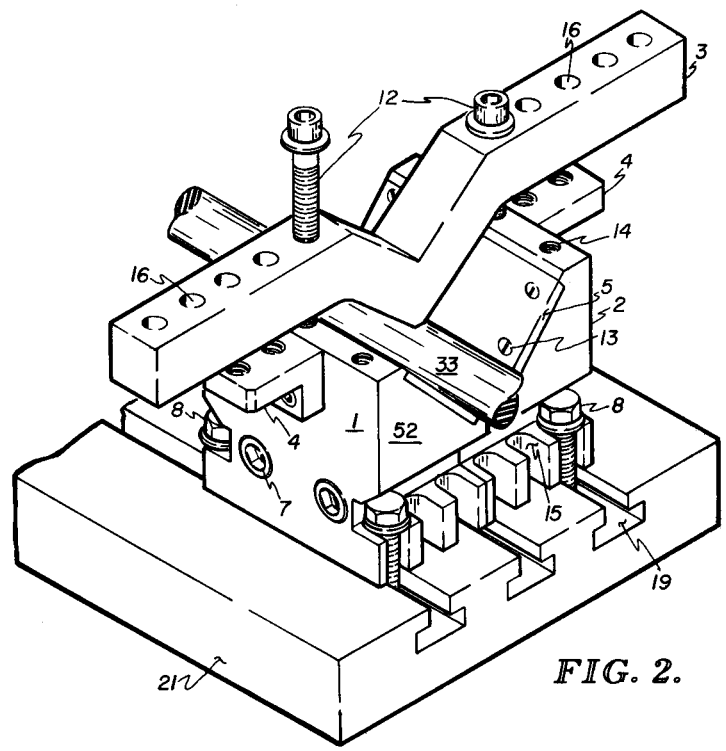
FIG. 2 is a perspective view of one split V-block with the clamp bar in the inverted position.

FIG. 2 shows the same device of FIG. 1 except the clamp bar 3 has been inverted to hold secure a small diameter rod 33. Also only one V-block is shown since the working piece (rod) 33 is assumed to be short in length. The clamp bar 3 is secured to the V-block 52 by bolts 12, into threaded holes 14. Four clamp bolts 8, one at each corner of the base of the V-block 52, secure the V-block to the milling table 21 by means of hold down slots 15 and T-slot 19 which contains the T-nut (see FIG. 3). Hardened steel inserts 5 with screws 13 are shown in each half 1, 2 of the V-block 52. Tie rods (not shown) hold together the halves 1 and 2 by means of allen nuts 7. Angle brackets 4 are shown to illustrate the adjustment capability for securing the clamp 3 to the V-block 52. (See FIG. 5.)

Figure 3:
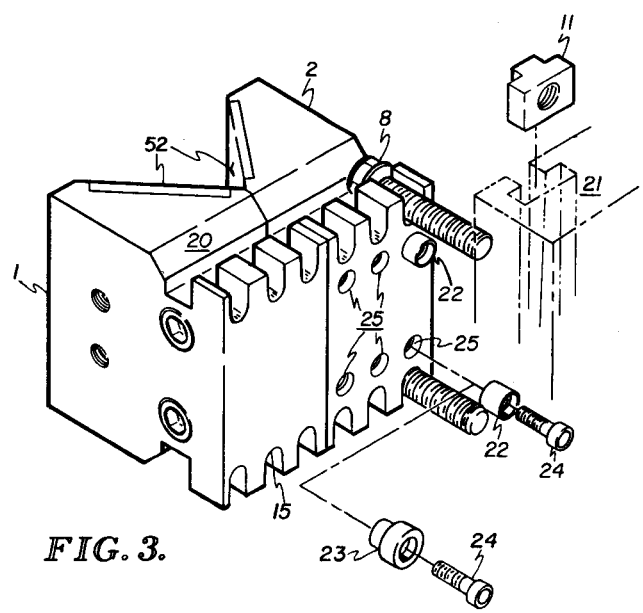
FIG. 3 is a base perspective view of FIG. 2 showing the bolting arrangement to the mill table and the precision positioning of the alignment key lugs.

In FIG. 3, the under side of each half 1, 2 of the V-block 52 shows an essential or critical feature of this invention. This feature consists of removable, round key lugs 22 or 23 that ensure repeated accurate alignment of the V-block. The key lug 22, 23 must be of a diameter to precisely fit (0.001 inch clearance) and extend into the upper narrow portion of T-slot 19. Three sets of two parallel threaded holes 25 are depicted, one set for each mode of expansion to secure key lugs 22, 23 by means of threaded lug screw 24 to block 2. The key lugs 22, 23 must be in alignment with hold down bolts 8 which engage hold down slots 15 and T-nut 11 that is contained in the T-slot of mill table 21. The key lugs 22, 23 need be placed in only one half 2 of the V-block 52. A 45° chamfer 20 positioned directly above the hold slots 15 runs the entire width of the V-block 52 and allows easy access to hold down bolts 8.

Figure 4:
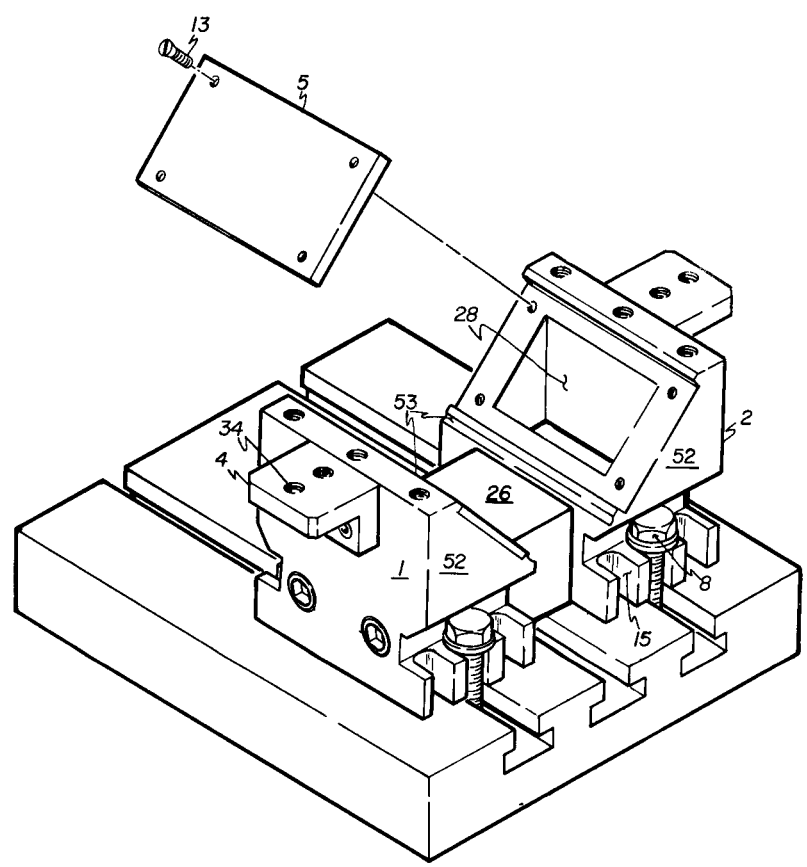
FIG. 4 is an exploded perspective of one V-block showing the steel insert plates, a cavity to make lighter the block of this invention, and a two-inch spacer inserted between each half of the V-block.

FIG. 4 shows an important feature of this invention, namely, a cavity 28 in keyed half block 2 behind insert 5. A like cavity is contained in half block 1. This is to decrease the weight of the "V" block to make it easier to handle. An additional feature is the insertion of 2-inch spacer block 26 between the base of notch 53. This allows the V-block 52 to be expanded for intermediate-sized workpieces. Note, because of spacer 26 the key lugs 22 of FIG. 3 must be moved to the center set of lug threaded holes 25 in the base of keyed half V-block 2 to align with the hold down bolts 8.

Figure 5:
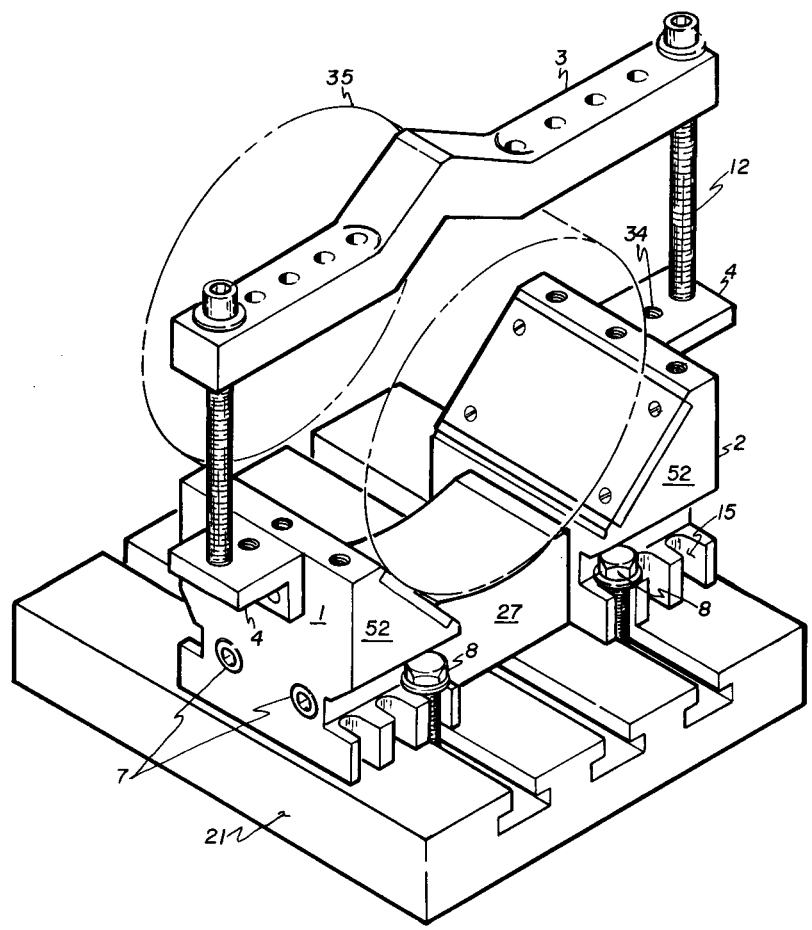
FIG. 5 is a perspective view of a large workpiece held in a single V-block and includes a four-inch spacer between each half of the V-block.

FIG. 5 illustrates a four-inch spacer 27 placed between each half 1, 2 of the V-block to permit clamping of a large diameter (12⅜ in.) workpiece 35. Clamp bar 3 holds piece 35 in the V-block 52 by using extended clamping bolts 12, angle brackets 4 with tapped holes 34. Extended tie rods with allen nuts 7, positioning hold down bolts 8 in the inner hold down slots 15 all assemble the V-block 52 to mill table 21. Key lugs 22 (see FIG. 3) are moved in half block 2 to align with hold down bolts 8.

Figure 6:
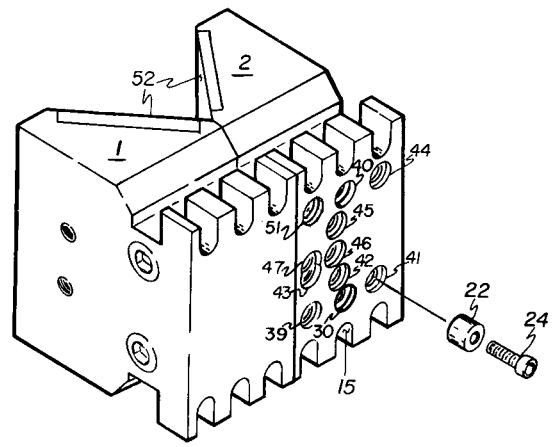
FIG. 6 is a view of FIG. 3 in which 30°, 45°, 60° key lug locations are shown.

FIG. 6 shows still a further embodiment for keying V-block 52 in 30°, 45°, 60° positions on the mill table. In the 30° position, threaded bore set (41, 45; 44, 42) would contain key lugs 22 secured by key lug screws 24; likewise, the 45° position would have threaded bore set (41, 46; 44, 46), and the 60° position would have set (44, 47; 41, 43). Viewed the right side of FIG. 6, the bore hole 41 is the left base alignment location; bore hole 42 is the left 30° location; bore hole 43 is the left 60° location; bore hole 44 is the right base alignment location; bore hole 45 is the right 30° location; bore hole 46 is the 45° location; bore hole 47 is the right 60° location; bore hole 30 is the middle left bore location; bore hole 39 is the upper left location; bore hole 40 is the middle right location; bore hole 51 is the upper right location.

Figure 7:
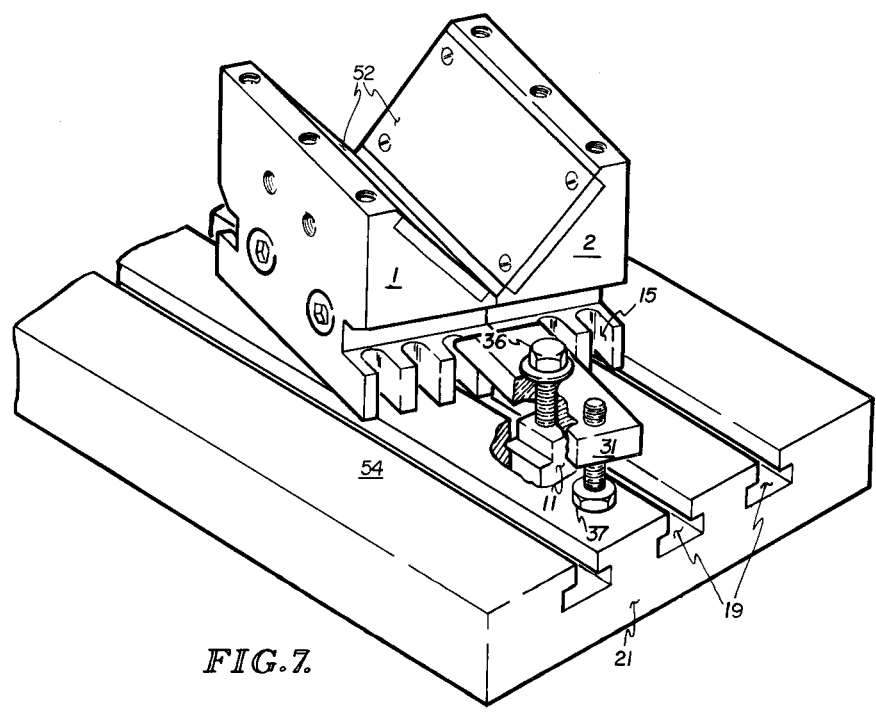
FIG. 7 is a partial cutaway view of a single V-block showing an alternate method of bolting the V-block to the mill table at the desired angle.

FIG. 7 shows the V-block 52 in a selected angle location (30°, 45°, 60°) and further shows a different embodiment of securing the block halves 1, 2 to the mill table 21 by means of strap clamp 31 supported by strap heel bolt 37 that is threaded into the base of clamp 31 and rests on mill table surface 54, and strap clamp bolt 36 through the top of strap clamp 31 into T-nut 11 contained in T-slot 19 of mill table 21. The bevel edge of strap clamp 36 engages the top portion of hold down slots 15 of each half 1, 2 of V-block 52.

Figure 8:
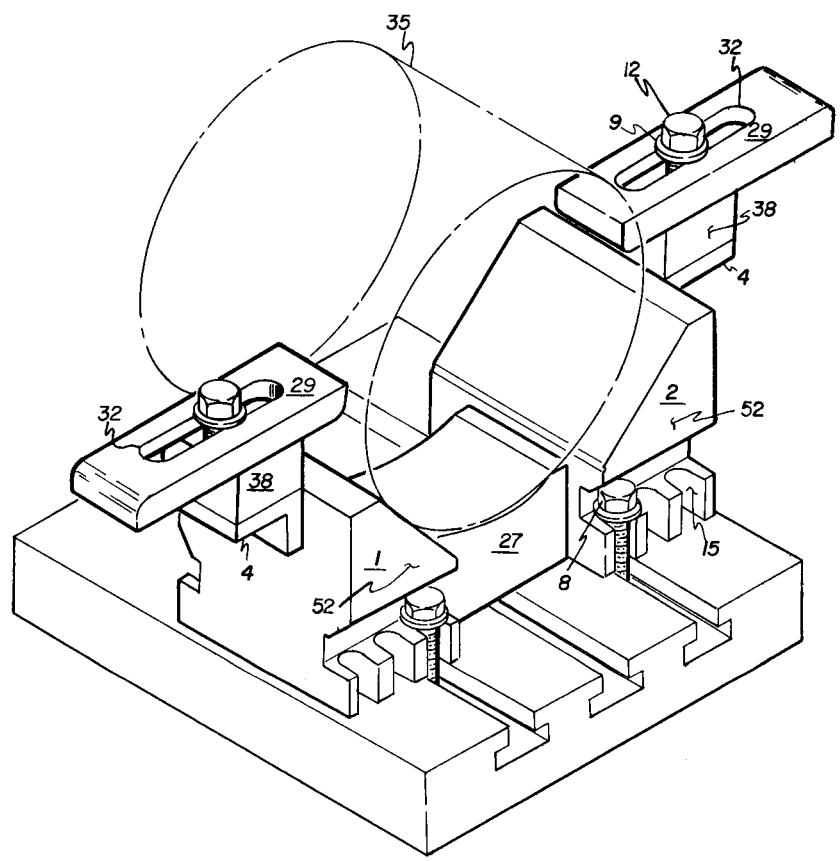
FIG. 8 is a view of FIG. 5 in which an alternate method of clamping the workpiece is shown.

FIG. 8 shows another clamping method to secure a large diameter working piece 35 in V-block 52 so as to have complete access to the top portion of piece 35. Side clamps 29 secure the piece against halves 1, 2. The side clamp 29 is attached to each half 1, 2 of the V-block by clamp bolt 12, washer 9 through strap slot 32 and riser block 38 and threaded into angle bracket 4 which has a tapped hole (not shown). Clamp 29 must be above the centerline of workpiece 35 to exert downward pressure.

Operation of Precision Aligned V-Block

The assembly procedure for preparation for machining a large workpiece is shown in FIG. 5. The two V-halves 1, 2 are assembled angle face in with four inch spacer block 27 with curved inner surface up. Each mode of expansion has its own clamp bar mounting location. Threaded rods 6 (9¼ inches) are inserted through holes 17 and secured with four allen nuts 7. This is done on a flat surface such as a mill table so that bottom surfaces are plane and parallel. Each mode of expansion has its own clamp bar mounting location. Angle brackets 4 are assembled on sides of each half of the V-block 1, 2 using two bracket mounting bolts 10 into threaded bucket holes 18. Round key lugs 22 are placed in bore location 39 and 51 (FIG. 6) using lug anchor bolts 24. Selection of the appropriate two key lug locations are dependent on the size and angle of the workpiece, and must correspond or align with the location of the bolted hold down slots. The assembled block 52 is ready to bolt down to mill table 21. With the anchor slots 15 nearest center of V-block 52 in line with the T-slots 19 of the mill table, the key lugs 22 in half of V-block 2 are inserted into T-slot 19. Clamp bolts 8 and T-nuts 11 which are inserted in T-slot 19 are used to secure V-block 52 to mill table 21 (FIG. 1). The workpiece 35 is then placed in the V-notch 53 and clamped using bar 3. Desired length clamping bolts 12 are placed through clamp bar holes 16 nearest workpiece 35 and threaded into bracket holes 34. Machining on the workpiece 35 can now begin.

The foregoing description of the preferred embodiment(s) of the invention have been presented for purposes of illustration and description. It is not intended to be exhaustive or to limit the invention to the precise form disclosed, and obviously many modifications and variations are possible in light of the above teaching. The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A light-weight, precision aligned V-block clamping device comprising:
   (1) two symmetrical and equal halves,
   (2) means for securing together the halves to form essentially a V-notch,
   (3) means for repeated and accurate alignment of the V-block device by using two, round key lugs in the base of one half of the V-block device, said key lugs being placed in T-slots of a mill table so as to form an angle selected from the class consisting of 30°, 45°, 60° and 180°, and
   (4) means for attaching the V-block device to the mill table using the T-slot of said table.

2. The V-block device of claim 1 in which the means for securing the halves together consists of two threaded tie rods that transversely extend through both halves of the V-block.

3. The V-block device of claim 1, in which between each half a two inch spacer block is inserted, and said spacer block having holes which allow passage of the tie rods.

4. The V-block device of claim 1 in which the means for attaching the V-block to the mill table comprises:
   (a) at least four hold down slots that are located along the bottom portion of each V-block, are perpendicular to and directly above the T-slot of the mill table,
   (b) a bolt engaging each hold down slot and being threaded into a T-nut that slideably fits into the T-slot of the mill table, and
   (c) a chamfer portion of the V-block being located and running transversely above hold down slots of the V-block.

5. The V-block device of claim 1 in which each half that forms the V-notch of the block has a steel insert, and said insert covers a rectangular shaped cavity contained within each half of the V-block.

6. The V-block device of claim 1 in which a four inch spacer block is inserted between each half.

7. The V-block device of claim 1 in which more than one device is attached to the mill table.

* * * * *